(12) United States Patent
Ohkuma et al.

(10) Patent No.: US 10,093,193 B2
(45) Date of Patent: Oct. 9, 2018

(54) CHARGING SYSTEM

(71) Applicant: NICHICON CORPORATION, Kyoto (JP)

(72) Inventors: Shigeo Ohkuma, Kameoka (JP); Ryota Kinomura, Kameoka (JP)

(73) Assignee: NICHICON CORPORATION, Kyoto-shi, Kyoto (JP)

( * ) Notice: Subject to any disclaimer, the term of this patent is extended or adjusted under 35 U.S.C. 154(b) by 99 days.

(21) Appl. No.: 15/282,006

(22) Filed: Sep. 30, 2016

(65) Prior Publication Data

US 2017/0182900 A1    Jun. 29, 2017

(30) Foreign Application Priority Data

Dec. 25, 2015  (JP) ................. 2015-254138

(51) Int. Cl.
*H02J 7/00*        (2006.01)
*B60L 11/18*       (2006.01)

(52) U.S. Cl.
CPC ....... *B60L 11/1818* (2013.01); *B60L 11/1809* (2013.01); *B60L 11/1811* (2013.01); *B60L 11/1816* (2013.01); *B60L 11/1844* (2013.01); *H02J 7/0013* (2013.01); *H02J 7/0027* (2013.01); *B60L 2230/16* (2013.01); *Y02T 10/7005* (2013.01); *Y02T 10/7088* (2013.01); *Y02T 90/127* (2013.01); *Y02T 90/128* (2013.01); *Y02T 90/14* (2013.01); *Y02T 90/16* (2013.01); *Y02T 90/163* (2013.01)

(58) Field of Classification Search
CPC ............. H02J 2007/0062; H02J 7/0027; H02J 7/0052; H02J 7/0019; H02J 7/0021; H02J 2007/0096; H02J 2007/0049; H02J 2007/005; H02J 50/40

USPC ................. 320/104, 109, 116–117, 119, 122
See application file for complete search history.

(56) References Cited

U.S. PATENT DOCUMENTS

| | | | |
|---|---|---|---|
| 2004/0189251 A1 | 9/2004 | Kutkut et al. | |
| 2012/0200256 A1 | 8/2012 | Tse | |
| 2013/0187602 A1* | 7/2013 | Bouman | B60L 11/1811 320/109 |
| 2014/0015319 A1* | 1/2014 | Nyu | H01M 10/44 307/31 |
| 2015/0378409 A1* | 12/2015 | Dunstan | G06F 13/385 713/310 |

FOREIGN PATENT DOCUMENTS

JP    5723811 B2    5/2015
WO    0197360 A     12/2001

OTHER PUBLICATIONS

Extended European Search Report dated May 19, 2017 in the corresponding European patent application No. 16191473.4.

* cited by examiner

*Primary Examiner* — Nghia Doan
(74) *Attorney, Agent, or Firm* — United IP Counselors, LLC (57) ABSTRACT

Provided is a charging system that causes usage conditions of chargers to be more equalized than before. A charging system includes a plurality of chargers. A controller of a first charger requests second chargers to output assistance power to a power sharing cable based on second charger information regarding the second charger when charge request from an electrically-powered vehicle connected to a charging port of the first charger exceeds output power capacity of a charging portion.

14 Claims, 7 Drawing Sheets

|  | Charger 11 | Charger 12 |  | Charger 1n |
|---|---|---|---|---|
| Surplus power[kW] | 0 | 50 |  | 50 |
| Total operating time [Hour] | 1,000 | 1,000 |  | 1,000 |
| Idling elapsed time [Hour] | 0 | 5 |  | 5 |
| Charge reservation setting | No | Yes |  | No |
| Even charging setting | No | — |  | — |
| Inter-charger distance[m] | — | 3 |  | 10 |

Own-charger information for charger 11 / Other-charger information for charger 11

CHARGING SYSTEM

CROSS-REFERENCE TO RELATED APPLICATIONS

This application claims the benefit of priority to Japanese Patent Application No. 2015-254138, filed on Dec. 25, 2015, the entire contents of which are hereby incorporated by reference.

BACKGROUND

1. Technical Field

The present invention relates to a charging system for an electrically-powered vehicle.

2. Description of the Background

There has been known a charging system for an electrically-powered vehicle such as an electric vehicle and a plug-in hybrid vehicle (Japanese Patent No. 5723811, hereinafter called Patent Document 1). A charging system of the related art includes a plurality of chargers capable of mutually supplying power through power cables. Each charger includes a charging connector, a secondary battery that supplies charge power to an electrically-powered vehicle, and a control unit that controls opening-closing of a switch arranged between the charging connector and the secondary battery and opening-closing of a switch arranged between the charging connector and a secondary battery of another charger.

In the charging system of the related art, when remaining level of the secondary battery built in a charger that is supposed to perform charging is low, the control unit of the charger opens the switch arranged between the charging connector and the secondary battery and closes the switch arranged between the charging connector and a secondary battery of another charger having sufficient remaining level among secondary batteries of other chargers. Thus, charging can be performed with power supplied from a secondary battery of another charger.

BRIEF SUMMARY

According to the charging system in Patent Document 1, the control unit considers only current remaining level of each secondary battery and does not consider usage conditions up to the present at all. Accordingly, in the charging system of the related art, there is a possibility that some chargers are deteriorated remarkably earlier than other chargers due to occurrence of deviation of usage conditions of chargers in long-term use.

An object of the present invention is to provide a charging system that causes usage conditions of chargers to be more equalized than before.

One aspect of the present invention is directed to a charging system for an electrically-powered vehicle, comprising:
 a plurality of chargers that include at least a first charger and a second charger and that are capable of communicating with one another, each of the chargers including
  at least one charging port detachably attachable to the electrically-powered vehicle,
  a charging portion connected to the charging port to output charge power to the charging port in accordance with charge request from the electrically-powered vehicle connected to the charging port, and
  a controller configured to control the charging portion; and
 a power sharing cable that connects the charging portions of the chargers,
 the controller of the first charger being configured to request the second charger to output assistance power to the power sharing cable based on second charger information regarding the second charger when the charge request power from the electrically-powered vehicle connected to the charging port of the first charger exceeds output power capacity of the charging portion of the first charger.

Another aspect of the present invention is directed to a charging system for an electrically-powered vehicle, comprising:
 a plurality of chargers that include at least a first charger and a second charger, each of the chargers including
  at least one charging port detachably attachable to the electrically-powered vehicle,
  a charging portion connected to the charging port to output charge power to the charging port in accordance with charge request from the electrically-powered vehicle connected to the charging port, and
  a controller configured to control the charging portion;
 a power sharing cable that connects the charging portions of the chargers; and
 a central controller configured to communicate with the respective chargers, the central controller being configured to request the second charger to output assistance power to the power sharing cable based on second charger information regarding the second charger when the charge request power from the electrically-powered vehicle connected to the charging port of the first charger exceeds output power capacity of the charging portion of the first charger.

According to the charging system of the present invention, usage conditions of chargers can be more equalized than before.

DETAILED DESCRIPTION

In the following, embodiments of a charging system of the present invention will be described with reference to the attached drawings.

Embodiment

Figure 1:
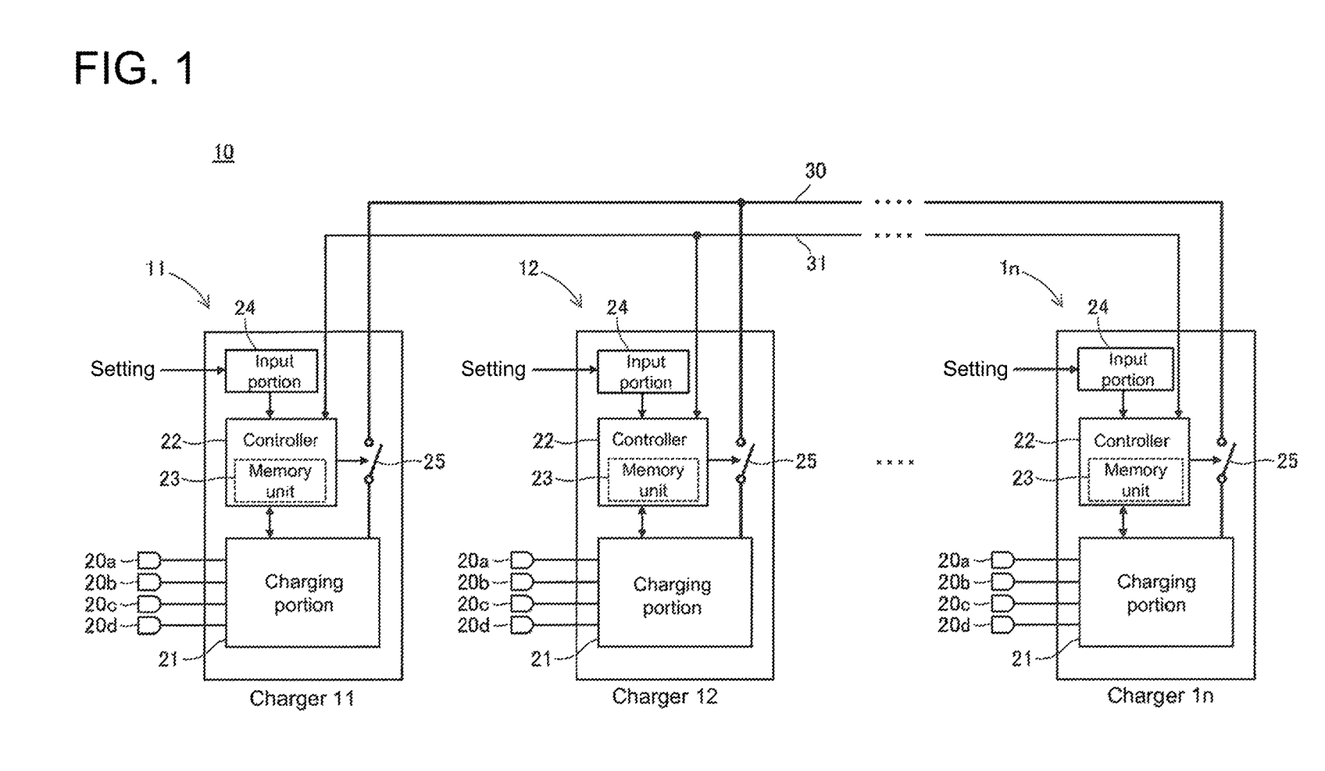
FIG. 1 is a block diagram illustrating a charging system of an embodiment.

A charging system 10 of an embodiment will be described with reference to FIG. 1. The charging system 10 includes n pieces of chargers 11, 12, . . . , 1n, a power sharing cable 30, and a communication cable 31 (communication unit). Here, n is an integer equal to or larger than two, and preferably, equal to or larger than three. The n pieces of chargers 11, 12, ..., 1n structure a charger group.

The chargers 11, 12, ..., 1n have the same configuration. Accordingly, description is provided on the charger 11 as a representative example.

The charger 11 includes at least one charging port 20a, 20b, 20c, 20d, a charging portion 21, a relay 25, a controller 22, and an input portion 24. In the following, each of the charging ports 20a, 20b, 20c, 20d is called the charging port 20 as well without distinction. The charging port 20 is capable of being detachably attachable to an electrically-powered vehicle such as an electric vehicle and a plug-in hybrid vehicle. The charging portion 21 outputs charge power to an electrically-powered vehicle connected to the charging port 20. The controller 22 controls the charging portion 21 and the relay 25. The input portion 24 receives a variety of inputs of a user. The power sharing cable 30 is connected to the charging portion 21. The controller 22 is connected to the communication cable 31. The relay 25 is interposed at the power sharing cable 30. The controller 22 includes a memory unit 23 that stores a variety of information.

The charging portion 21 includes a power converting circuit that outputs, to the charging port 20, direct-current power generated from commercial alternate-current power as charge power. The charging portion 21 generates direct-current power in a range without exceeding output power capacity (rated output power) set in advance. It is also possible that the charging portion 21 of the charger 11 outputs, as charge power, power being the sum of own direct-current power generated thereby and direct-current assisting power output from another charger 12, ..., 1n through the power sharing cable 30.

The controller 22 includes a microprocessor (MPU: micro processing unit). The controller 22 perceives charge request from the electrically-powered vehicle connected to the charging port 20, and charge power output to the charging port 20 by the charging portion 21. The controller 22 controls the charging portion 21 and the relay 25. The controller 22 transmits request for outputting assistance power (hereinafter, called assistance request). The controller 22 performs an information sharing process described later. The information sharing process is repeated every time when a predetermined period of time passes. Here, the controller 22 controls the charging portion 21 and the relay 25 when predetermined conditions are satisfied. Further, the controller 22 transmits the assistance request when predetermined conditions are satisfied.

The memory unit 23 is structured with a volatile memory such as a random access memory and/or a non-volatile memory such as a flash memory. The memory unit 23 stores setting received by the input portion 24, own-charger information (first charger information), and other-charger information (second charger information). The own-charger information denotes information regarding the charger 11. The other-charger information denotes information regarding other chargers 12, ..., 1n received by the controller 22 in the information sharing process.

For example, the input portion 24 is a touch-screen display. The input portion 24 receives setting of charge reservation and setting of even charging.

Switching of the relay 25 is controlled by the controller 22. The controller 22 of the charger 11 closes the relay 25 when assistance power is supplied from the other chargers 12, ..., 1n and when assistance request is received from any of the other chargers 12, ..., 1n. Thus, power is shared through the power sharing cable 30. In cases other than the above, the controller 22 opens the relay 25. It is preferable that a backflow prevention device such as a diode is provided to the relay 25 to prevent power from being supplied in a direction opposite to an intended direction.

Figure 2:
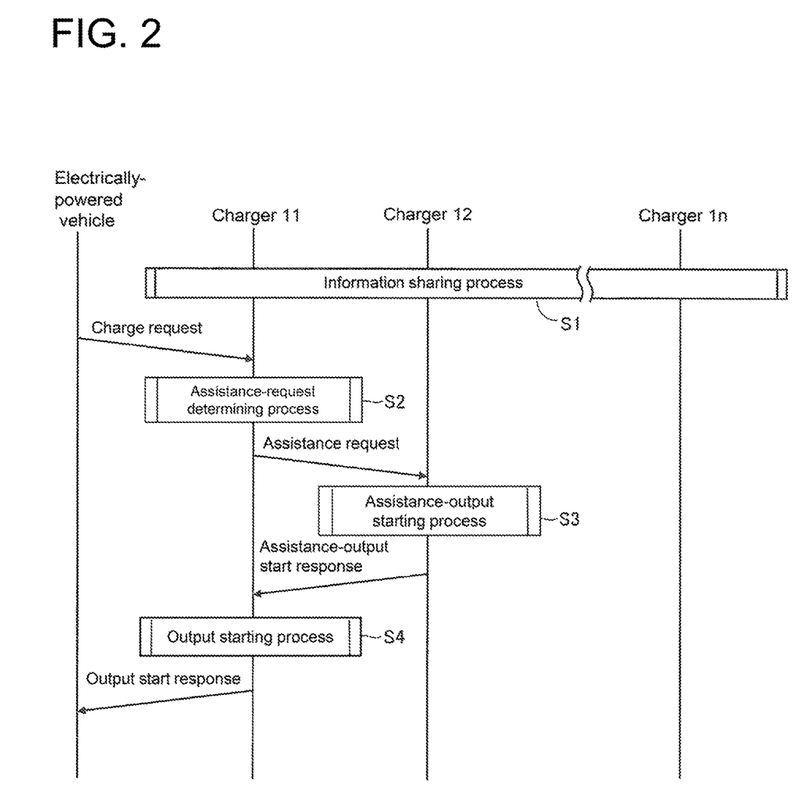
FIG. 2 is a sequence diagram illustrating operation of the charging system of the embodiment.

FIG. 2 is a sequence diagram illustrating operation of the charging system 10 of the present embodiment. The operation of the charging system 10 includes the information sharing process S1, an assistance-request determining process S2, an assistance-output starting process S3, and an output starting process S4.

The information sharing process S1 is repeated by the respective controllers 22 of all the chargers 11, 12, ..., 1n every time when the predetermined period of time passes. Accordingly, updated information of each charger is constantly shared.

The assistance-request determining process S2 is performed by the controller 22 of the charger that receives charge request from an electrically-powered vehicle (i.e., the charger 11 in FIG. 2). In the assistance-request determining process S2, the controller 22 determines whether or not requested charge power can be output only by the charging portion 21 of the charger 11. In a case of determination that the requested charge power cannot be output thereby, the controller 22 selects an assistance charger (the charger 12 in FIG. 2) among the other chargers 12, ..., 1n. The controller 22 transmits assistance request to the charger 12 through the communication cable 31 and closes the relay 25 of the charger 11. On the other hand, in a case of determination that the requested charge power can be output thereby, the controller 22 causes the charging portion 21 to output the requested charge power (i.e., the output starting process S4). At that time, the relay 25 of the charger 11 is kept opened.

The controller 22 of the charger 12 that received the assistance request closes the relay 25 of the charger 12 and causes the charging portion 21 of the charger 12 to start outputting assistance power (i.e., the assistance-output starting process S3).

Then, the controller 22 of the charger 11 causes the charging portion 21 of the charger 11 to output charge power including assistance power output from the charger 12 (i.e., the output starting process S4).

Figure 3:
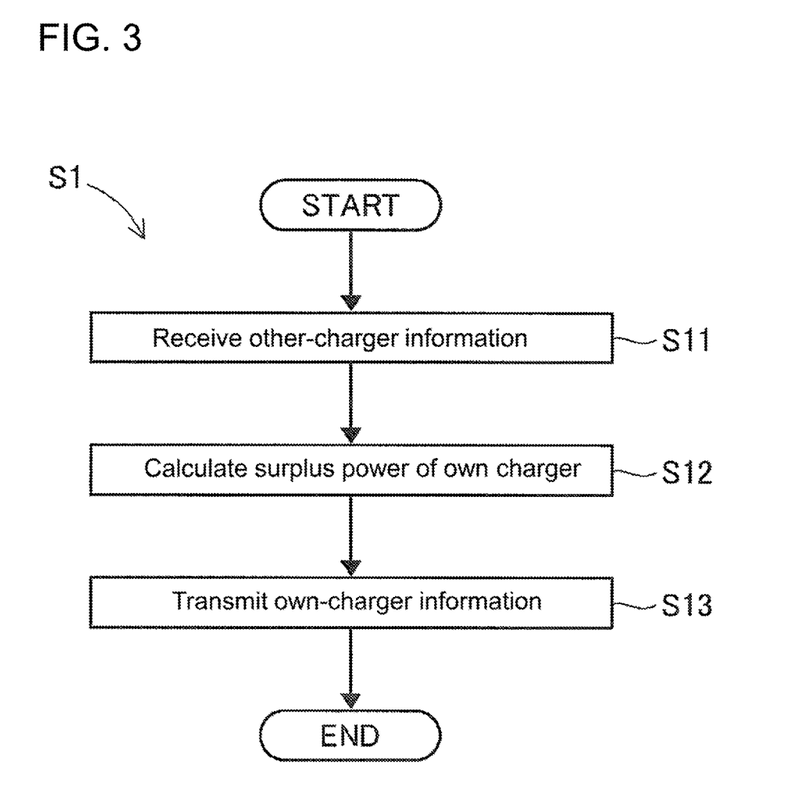
FIG. 3 is a flowchart illustrating an information sharing process in FIG. 2.

The information sharing process S1 will be described in detail with reference to FIG. 3. The information sharing process S1 includes steps S11 to S13. The steps S11 to S13 are performed in a sequential order. Here, it is also possible that step S11 may be performed after step S13.

In step S11, the controller 22 of each charger receives other-charger information. The other-charger information denotes information indicating usage conditions of the other chargers up to the present. The other-charger information includes, for example, information of surplus power, a total operating time, an idling elapsed time, and charge reservation setting. The surplus power is calculated with the following equation.

$$\text{Surplus power} = (\text{Output power capacity of charging portion 21}) - (\text{Sum of charge power output by charging portion 21})$$

The total operating time is acquired by integrating times for which the charging portion 21 output charge power up to the present. The idling elapsed time denotes an elapsed time from time at which the charging portion 21 became into an idling state (i.e., a state without outputting charge power) to the present time. The charge reservation setting denotes presence or absence of charge reservation provided by a user. The received other-charger information is stored in the memory unit 23. At that time, old other-charger information stored in the memory unit 23 is erased.

According to the present embodiment, since the other-charger information includes information indicating usage conditions up to the present, it is possible to suppress a phenomenon that some charger is deteriorated earlier than other chargers.

In step S12, the controller 22 of each charger calculates surplus power of the own charger. In step S13, the controller 22 of each charger transmits own-charger information. The own-charger information includes information of the surplus power calculated in step S12, the total operating time, the idling elapsed time, and the charge reservation setting.

Information of all the chargers 11, 12, . . . , 1n of the charging system 10 is shared through the information sharing process S1.

Figure 4:
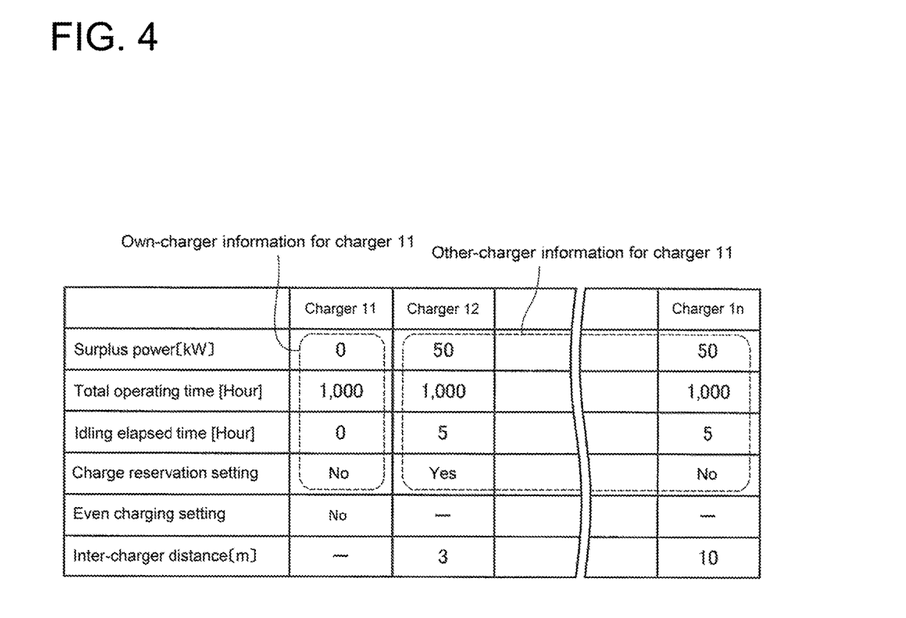
FIG. 4 is a table showing information stored in a memory unit of the charging system.

FIG. 4 shows an example of information stored in the memory unit 23 of the charger 11 after the information sharing process S1 is performed for one or more times. The memory unit 23 stores own-charger information, other-charger information, and even charging setting of the charger 11. The own-charger information includes information of surplus power, a total operating time, an idling elapsed time, and charge reservation setting of the charger 11. The other-charger information includes information of surplus power, a total operating time, an idling elapsed time, charge reservation setting of the chargers 12, . . . , 1n. Further, inter-charger distance with respect to the charger 11 is stored in the memory unit 23 of the charger 11. The inter-charger distance is input, for example, by an installation worker through the input portion 24 at the time of installation of the charging system 10.

Figure 5:
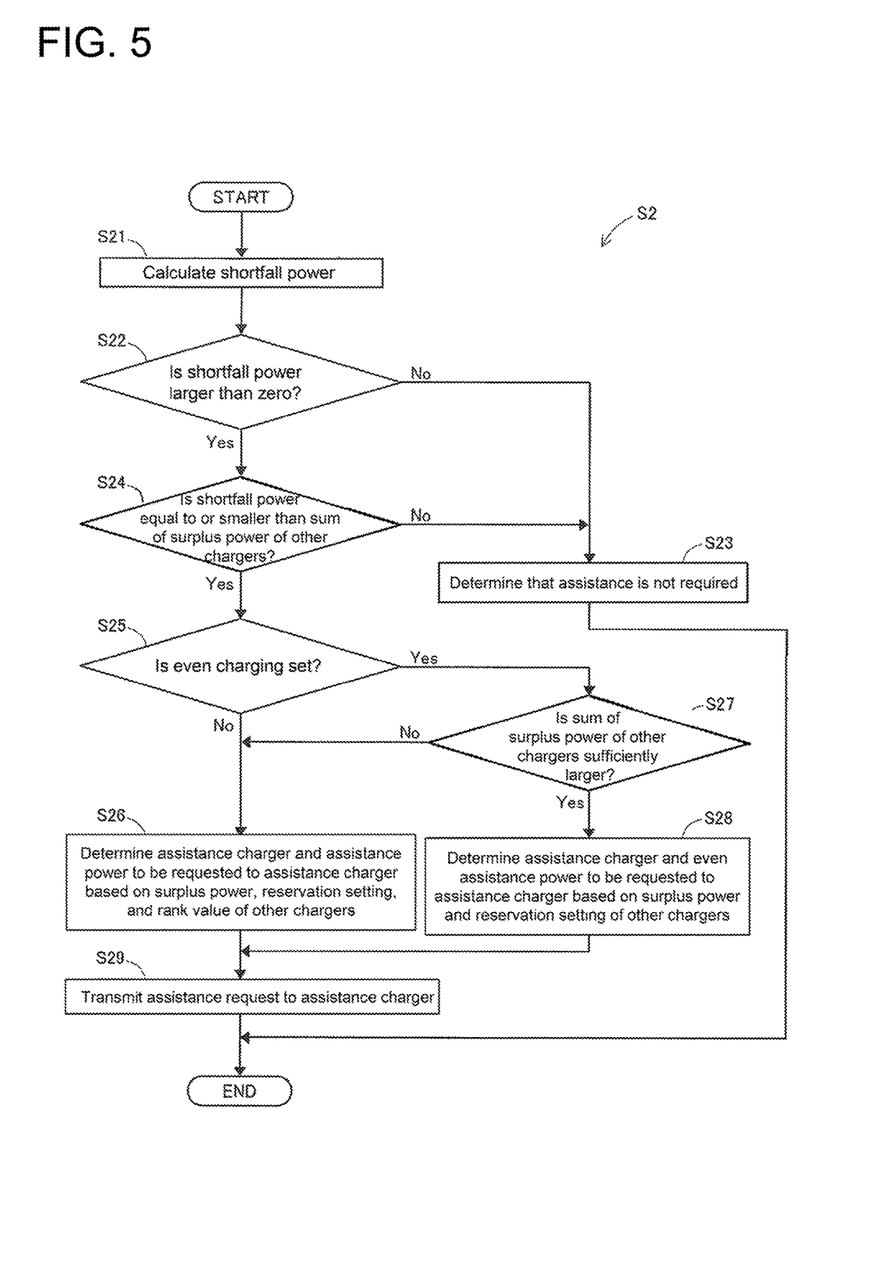
FIG. 5 is a flowchart illustrating an assistance-request determining process in FIG. 2.

Next, the assistance-request determining process S2 will be described in detail with reference to FIG. 5. The assistance-request determining process S2 includes steps S21 to S29. In the following, description will be provided on a case that the charger 11 receives charge request from an electrically-powered vehicle.

In step S21, the controller 22 of the charger 11 calculates shortfall power with the following equation.

Shortfall power=(Sum of charge power output by charging portion 21+Charge request power)−(Output power capacity)

For example, in a case that the output power capacity is 50 kW, the charge request power of an electrically-powered vehicle newly connected to the charging port 20a is 20 kW, and the charging ports 20b, 20c, 20d are not used, the shortfall power is −30 kW. The above means that power of 30 kW remains even if power of 20 kW is output as required to the newly-connected electrically-powered vehicle. In contrast, in a case that the output power capacity is 50 kW, the charge request power of an electrically-powered vehicle newly connected to the charging port 20a is 20 kW, and charge power of 40 kW in total is output from the charging ports 20b, 20c, 20d, the shortfall power is 10 kW. The above means that shortage of 10 kW occurs when power of 20 kW is to be output as required to the newly-connected electrically-powered vehicle.

In step S22, the controller 22 of the charger 11 determines whether or not the shortfall power calculated in step S21 is larger than 0 kW. When the determination condition is not satisfied (i.e., when charge power can be output as required only by the charging portion 21 of the charger 11), it is determined that assistance is not requested to the other chargers 12, . . . , 1n (step S23). On the other hand, when the determination condition is satisfied (i.e., when charge power cannot be output as required only by the charging portion 21 of the charger 11), it proceeds to step S24.

In step S24, the controller 22 of the charger 11 determines whether or not the shortfall power calculated in step S21 is equal to or smaller than the sum of the surplus power of the other chargers 12, . . . , 1n. At that time, the controller 22 refers to the memory unit 23. When the determination condition is not satisfied (i.e., when charge power cannot be output as required even if all the surplus power of the other chargers 12, . . . , 1n is used as assistance power), it is determined that assistance is not required to the other chargers 12, . . . , 1n (S23). At that time, the newly-connected electrically-powered vehicle may be informed of that charging cannot be started immediately. Thus, it is possible to prevent outputting of assistance power from being requested to the other chargers 12, . . . , 1n regardless of that the charge request of the electrically-powered vehicle cannot be satisfied. On the other hand, when the determination condition is satisfied (i.e., when charge power can be output as required if the surplus power of the other chargers 12, . . . , 1n is used as assistance power), it proceeds to step S25.

In step S25, the controller 22 of the charger 11 refers to the memory unit 23 and determines whether or not setting of even charging is provided. The even charging denotes a charging method, in a case that a plurality of chargers are capable of outputting assistance power, to cause the chargers to output assistance power evenly. It proceeds to step S26 when the even charging setting is not provided, while it proceeds to step S27 when the even charging setting is provided.

In step S26, the controller 22 of the charger 11 determines one or more chargers (assistance chargers) to output assistance power and assistance power to be requested to each of the assistance chargers based on the surplus power, charge reservation setting, and a rank value of the other chargers 12, . . . , 1n. At that time, the controller refers to the memory unit 23.

In step S26, the controller 22 of the charger 11 calculates rank values of the other chargers 12, . . . , 1n with the following equation as referring to the memory unit 23.

Rank value=(A×idling elapsed time)/(B×total operating time+C×inter-charger distance)

Here, coefficients A, B, C are weighting coefficients set in advance, while A>0, B>0, and C>0. As is clear from the above equation, the rank value is increased with increase of the idling elapsed time. The rank value is decreased with increase of the total operating time. Further, the rank value is decreased with increase of the inter-charger distance. A charger having a high rank value is more suitable for the assistance charger than a charger having a small rank value.

Next, the controller 22 of the charger 11 excludes chargers with charge reservation setting among the other chargers 12, . . . , 1n from candidates of assistance chargers. Thus, the charge reservation can be prevented from being cancelled by preventing the charger to which charge reservation is set by a user from becoming to an assistance charger.

Next, the controller 22 of the charger 11 sets a charger (e.g., the charger 12) having the largest surplus power among the non-excluded chargers 12, . . . , 1n as an assistance charger. Then, it is determined that the assistance charger is required to output assistance power within a range of the surplus power. When the surplus power of the charger 12 is equal to or larger than the shortfall power, the entire shortfall power can be compensated by the assistance power from the charger 12. In this case, step S26 is completed. On the other hand, when the surplus power of the charger 12 is smaller than the shortfall power, only a part of the shortfall power can be compensated by the assistance power from the charger 12. In this case, it is determined that a charger (e.g., the charger 13) having the next largest surplus power being next to the surplus power of the charger 12 among the non-excluded chargers 12, . . . , 1n is also required to output assistance power within a range of the surplus power.

When two or more of the other chargers 12, . . . , 1n have the same surplus power, a charger having a higher rank value becomes to an assistance charger on a priority basis. For example, the charger 12 having the surplus power of 50 kW and the rank value of seven, the charger 13 having the surplus power of 40 kW and the rank value of six, and the charger 14 having the surplus power of 40 kW and the rank value of eight are candidates of assistance chargers, the charger 12 is caused to become to the first assistance charger. When the entire shortfall power cannot be compensated only by the surplus power of the charger 12, the charger 14 is caused to become to the second assistance charger. When the entire shortfall power cannot be compensated even by the sum of the surplus power of the charger 12 and the charger 14, the charger 13 is further caused to become the third assistance charger.

In step S27, the controller 22 of the charger 11 determines whether or not the sum of the surplus power of the other chargers 12, . . . , 1n is sufficiently large with respect to the shortfall power (e.g., whether or not the sum of the surplus power thereof is equal to or larger than twice the shortfall power). At that time, the controller 22 refers to the memory unit 23. When the determination condition is not satisfied, even charging is not adequate to be performed or there is a high possibility that even charging cannot be performed. Accordingly, step S26 is performed and the assistance charger and the assistance power are determined. In this case, even charging is not performed. On the other hand, when the determination condition is satisfied, it proceeds to step S28.

In step S28, the controller 22 of the charger 11 excludes chargers with charge reservation setting and chargers with surplus power of 0 kW among the other chargers 12, . . . , 1n from candidates of assistance chargers. Then, the controller 22 sets the non-excluded chargers 12, . . . , 1n as assistance chargers and calculates assistance power with the following equation.

Assistance power=(Shortfall power)/(Number of assistance chargers)

According to the even charging function, usage conditions of the respective chargers can be more equalized.

In step S29, the assistance request is transmitted to the assistance charger(s) based on the determination in step S26 or step S28.

Next, description will be provided on operational examples of the charging system 10 of the present embodiment. In each following operational example, the number n of the chargers is four and output power capacity of the charging portion 21 of each charger 11, 12, 13, 14 is 50 kW. In operational examples 1 and 2, even charging setting is not provided on the charger 11. In operational examples 3 and 4, even charging setting is provided on the charger 11. Here, even charging is performed under conditions that the sum of the surplus power of other chargers is equal to or larger than twice shortfall power. When the sum is smaller than twice the shortfall power, even charging is not performed even if even charging setting is provided.

Operational Example 1 (Even Charging Setting: No)

TABLE 1

| Charger | Charging port 20a [kW] | Charging port 20b [kW] | Charging port 20c [kW] | Charging port 20d [kW] | Surplus power [kW] | Rank value | Reservation | Assistance power [kW] |
|---|---|---|---|---|---|---|---|---|
| 11 | 10 | 0 | 20 | 30 | −10 | — | No | — |
| 12 | 0 | 0 | 0 | 0 | 50 | 9 | No | 10 |
| 13 | 0 | 0 | 0 | 0 | 50 | 8 | No | 0 |
| 14 | 0 | 0 | 0 | 0 | 50 | 7 | No | 0 |

The charger 11 outputs charge power of 50 kW in total from the charging ports 20c, 20d. The chargers 12, 13, 14 output no charge power. Charge reservation is not set to any of the chargers 11, 12, 13, 14. Then, charge request for 10 kW is transmitted from an electrically-powered vehicle newly connected to the charging port 20a of the charger 11 and shortage of 10 kW occurs. In this case, the charger 12 having the largest rank value among the chargers 12, 13, 14 becomes to an assistance charger. The charger 12 outputs assistance power of 10 kW to the charger 11.

Operational Example 2 (Even Charging Setting: No)

TABLE 2

| Charger | Charging port 20a [kW] | Charging port 20b [kW] | Charging port 20c [kW] | Charging port 20d [kW] | Surplus power [kW] | Rank value | Reservation | Assistance power [kW] |
|---|---|---|---|---|---|---|---|---|
| 11 | 10 | 0 | 20 | 30 | −10 | — | No | — |
| 12 | 0 | 0 | 0 | 0 | 50 | 9 | Yes | 0 |
| 13 | 0 | 0 | 0 | 0 | 50 | 8 | No | 10 |
| 14 | 0 | 0 | 0 | 0 | 50 | 7 | No | 0 |

The charger 11 outputs charge power of 50 kW in total from the charging ports 20c, 20d. The chargers 12, 13, 14 output no charge power. Charge reservation is set only to the charger 12. Then, charge request for 10 kW is transmitted from an electrically-powered vehicle newly connected to the charging port 20a of the charger 11 and shortage of 10 kW occurs. In this case, first, the charger 12 with charge reservation setting is excluded from candidates of assistance chargers. The charger 13 having the largest rank value among the non-excluded chargers 13, 14 becomes to an assistance charger. The charger 13 outputs assistance power of 10 kW to the charger 11.

Operational Example 3 (Even Charging Setting: Yes)

TABLE 3

| Charger | Charging port 20a [kW] | Charging port 20b [kW] | Charging port 20c [kW] | Charging port 20d [kW] | Surplus power [kW] | Rank value | Reservation | Assistance power [kW] |
|---|---|---|---|---|---|---|---|---|
| 11 | 30 | 0 | 30 | 30 | −40 | — | No | — |
| 12 | 0 | 30 | 0 | 0 | 20 | 9 | No | 10 |
| 13 | 0 | 0 | 20 | 0 | 30 | 9 | No | 30 |
| 14 | 0 | 0 | 0 | 30 | 20 | 8 | No | 0 |

The charger 11 outputs charge power of 30 kW from the charging port 20a. The chargers 12, 13, 14 output charge power of 30 kW, 20 kW, 30 kW, respectively. Charge reservation is not set to any of the chargers 11, 12, 13, 14. Then, charge request for 60 kW in total is transmitted from electrically-powered vehicles newly connected to the charging ports 20c, 20d of the charger 11 and shortage of 40 kW occurs. In this case, the charger 13 having the largest surplus power among the chargers 12, 13, 14 becomes to an assistance charger. The charger 13 outputs assistance power of 30 kW to the charger 11. Further, the charger 12 having the next largest surplus power being next to the charger 13 and having the largest rank value becomes to the second assistance charger. The charger 12 outputs assistance power of 10 kW to the charger 11.

In the present operational example, even charging setting is provided to the charger 11. However, since the sum of the surplus power (70 kW) of the chargers 12, 13, 14 is smaller than twice shortfall power (40 kW), even charging is not to be performed.

Operational Example 4 (Even Charging Setting: Yes)

TABLE 4

| Charger | Charging port 20a [kW] | Charging port 20b [kW] | Charging port 20c [kW] | Charging port 20d [kW] | Surplus power [kW] | Rank value | Reservation | Assistance power [kW] |
|---|---|---|---|---|---|---|---|---|
| 11 | 30 | 0 | 30 | 20 | −30 | — | No | — |
| 12 | 0 | 0 | 0 | 0 | 50 | 9 | No | 10 |
| 13 | 0 | 0 | 0 | 0 | 50 | 8 | No | 10 |
| 14 | 0 | 0 | 0 | 0 | 50 | 8 | No | 10 |

The charger 11 outputs charge power of 30 kW from the charging port 20a. The chargers 12, 13, 14 output no charge power. Charge reservation is not set to any of the chargers 11, 12, 13, 14. Then, charge request for 50 kW in total is transmitted from electrically-powered vehicles newly connected to the charging ports 20c, 20d of the charger 11 and shortage of 30 kW occurs. In this case, all the chargers (chargers 12, 13, 14) to which charge reservation is not set and whose surplus power is not 0 kW become to assistance chargers. The chargers 12, 13, 14 output assistance power of 10 kW (=30/3 kW) to the charger 11, respectively.

In the present operational example being different from operational example 3, since the sum of the surplus power (150 kW) of the chargers 12, 13, 14 is larger than twice shortfall power (30 kW), even charging is performed in accordance with the setting.

Modified Example

Figure 6:
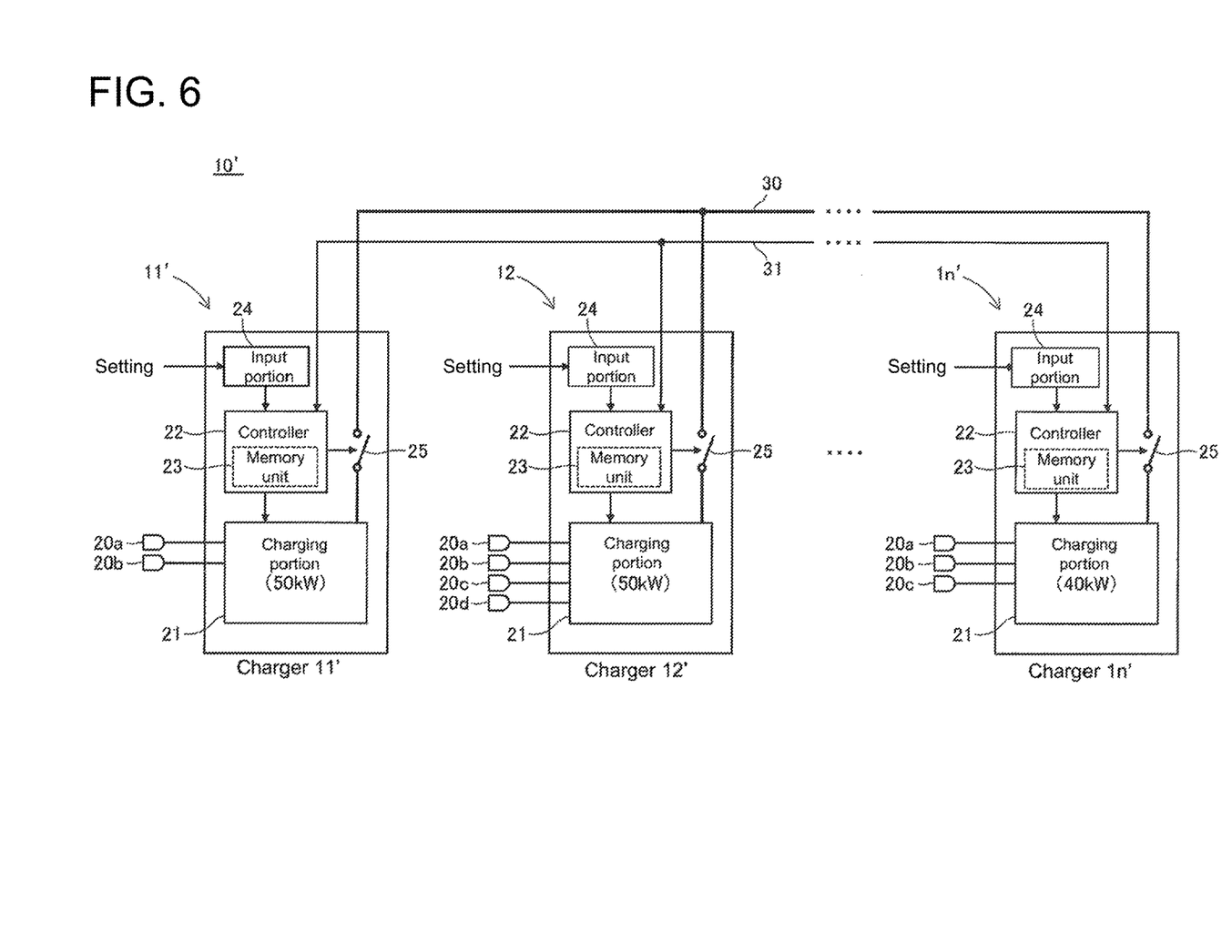
FIG. 6 is a block diagram of a charging system of a modified example.

The charging system of the present invention is not limited to the abovementioned embodiments. For example, the charging system may include a plurality of chargers having different configurations. FIG. 6 illustrates an example of a charging system 10' of a modified example. A charger 11' includes two charging ports 20a, 20b and a charging portion 21 whose output power capacity is 50 kW. A charger 12' includes four charging ports 20a, 20b, 20c, 20d and a charging portion 21 whose output power capacity is 50 kW. A charger 1n' includes three charging ports 20a, 20b, 20c and a charging portion 21 whose output power capacity is 40 kW.

Surplus power, a total operating time, an idling elapsed time, and charge reservation setting are simply examples of other-charger information and own-charger information. Other-charger information and own-charger information can be appropriately varied as long as at least one piece of information regarding usage conditions thereof up to the present is included. Further, the rank value may be calculated differently from the abovementioned embodiment.

In the charging system of the present invention, the even charging function may be eliminated. In this case, it is not required to perform steps S25, S27, S28 of the assistance-request determining process S2.

In the charging system of the present invention, the charge reservation function may be eliminated. In this case, it is not required to consider charge reservation setting in steps S26, S28 of the assistance-request determining process S2.

In the charging system of the present invention, communication among chargers may be performed wirelessly.

In the charging system of the embodiment, each of the controllers 22 of the chargers 11, 12, . . . , 1n includes the memory unit 23. Alternatively, a variety of information may be stored in a common memory unit arranged outside the chargers 11, 12, . . . , 1n. Alternatively, a variety of information may be stored in a memory unit arranged in any of the chargers 11, 12, . . . , 1n. In this case, the controller of a charger without having a memory unit is simply required to refer to the memory unit arranged in any thereof.

Figure 7:
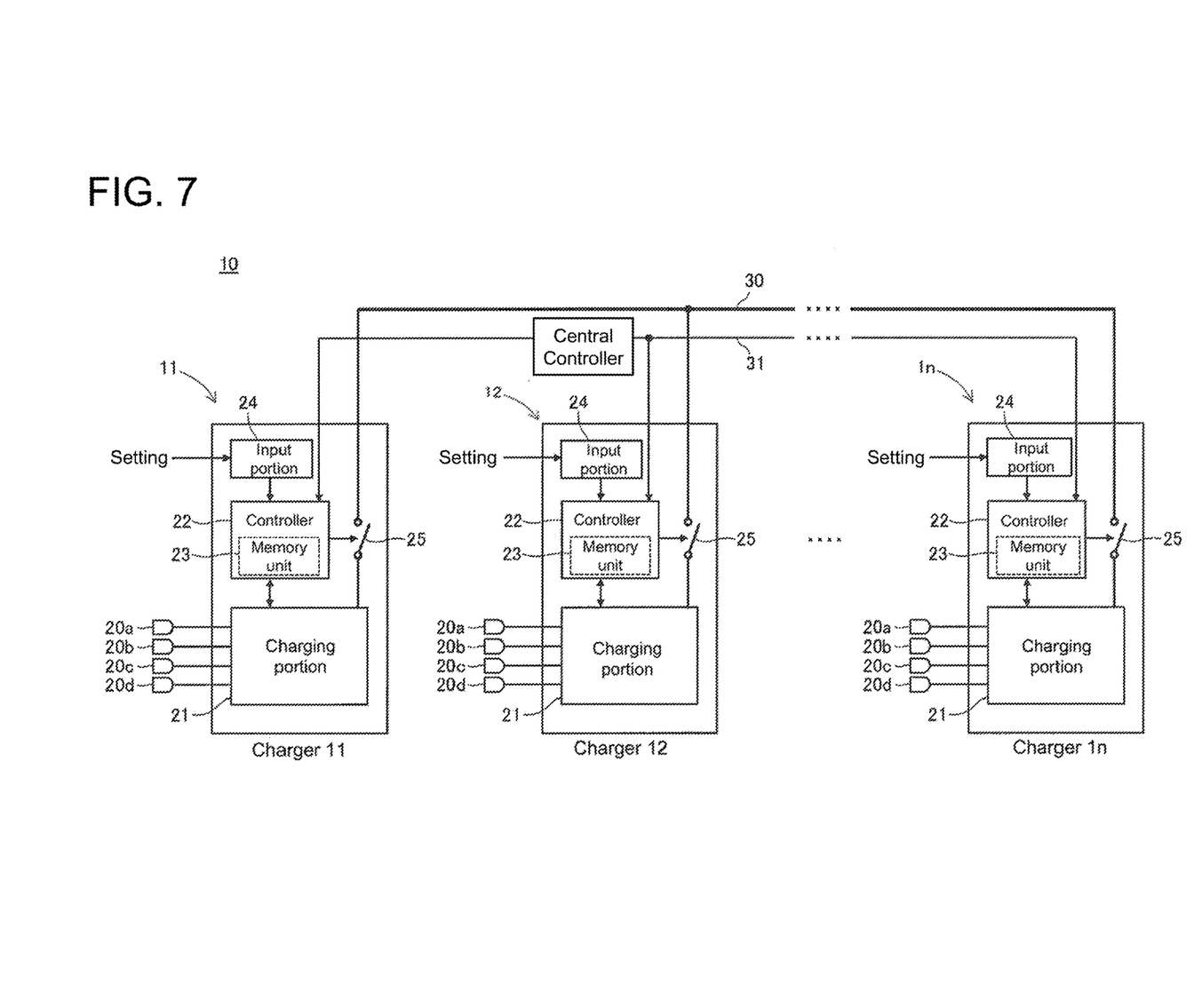
FIG. 7 is a block diagram of a charging system of another modified example.

In the charging system of the embodiment, a controller of a charger transmits assistance request to another charger. As shown in FIG. 7, it is also possible to arrange a central controller communicably connected to the respective chargers 11, 12, . . . , 1n through a communication cable (communication unit). In this case, the central controller may cause another charger to output assistance power by transmitting assistance request thereto and may control switching of the relays 25 of the respective chargers.

REFERENCE SIGNS LIST

10 Charging system
11, 12, 13, 14, . . . , 1n Charger
20a, 20b, 20c, 20d Charging port
21 Charging portion
22 Controller
23 Memory unit
24 Input portion
25 Relay
30 Power sharing cable
31 Communication cable (Communication unit)

What is claimed is:

1. A charging system for an electrically-powered vehicle, comprising:
    a plurality of chargers that include at least a first charger and a second charger and that are capable of communicating with one another, each of the chargers including
        at least one charging port detachably attachable to the electrically-powered vehicle,
        a charging portion connected to the charging port to output charge power to the charging port in accordance with a charge request from the electrically-powered vehicle when connected to the charging port, and
        a controller configured to control the charging portion; and
    a power sharing cable that connects the charging portions of the chargers,
    the controller of the first charger configured to request the second charger to output assistance power to the power sharing cable based on second charger information regarding the second charger when the charge request power from the electrically-powered vehicle when connected to the charging port of the first charger exceeds output power capacity of the charging portion of the first charger, wherein the controller is configured to receive the second charger information at regular time intervals.

2. The charging system according to claim 1, wherein the second charger information includes surplus power acquired by subtracting a sum of charge power output by the second charger from output power capacity of the second charger.

3. The charging system according to claim 2, wherein the second charger information further includes a total operating time being a sum of times for which the second charger has output charge power.

4. The charging system according to claim 2, wherein the second charger information further includes an elapsed time from when the second charger becomes into an idling state.

5. The charging system according to claim 2, wherein the controller of the first charger is configured to perform requesting for assistance power outputting only when an excess amount of the charge request power from the electrically-powered vehicle when connected to the charging port of the first charger exceeding the output power capacity of the first charger is equal to or smaller than a sum of the surplus power of the other chargers including the second charger.

6. The charging system according to claim 1,
    wherein each of the chargers further includes an input portion configured to receive setting of a charge reservation provided by a user,
    the second charger information further includes the setting of the charge reservation, and
    the controller of the first charger is configured to exclude a charger having the charge reservation among the other chargers including the second charger from destinations of request for the assistance power outputting.

7. The charging system according to claim 2,
    wherein each of the chargers further includes an input portion configured to receive setting of even charging provided by a user, and
    the controller of the first charger is configured, when the setting of even charging is provided, to exclude a charger with surplus power being zero among the other chargers including the second charger from destinations of request for the assistance power outputting and to perform requesting for the assistance power outputting evenly to each of the other chargers that are not excluded.

8. A charging system for an electrically-powered vehicle, comprising:
    a plurality of chargers that include at least a first charger and a second charger, each of the chargers including
        at least one charging port detachably attachable to the electrically-powered vehicle,
        a charging portion connected to the charging port to output charge power to the charging port in accordance with a charge request from the electrically-powered vehicle when connected to the charging port, and
        a controller configured to control the charging portion;
    a power sharing cable that connects the charging portions of the chargers; and
    a central controller configured to communicate with the respective chargers, the central controller configured to request the second charger to output assistance power to the power sharing cable based on second charger information regarding the second charger when the charge request power from the electrically-powered vehicle when connected to the charging port of the first charger exceeds output power capacity of the charging portion of the first charger, wherein the central controller is configured to receive the second charger information at regular time intervals.

9. The charging system according to claim 8, wherein the second charger information includes surplus power acquired by subtracting a sum of charge power output by the second charger from output power capacity of the second charger.

10. The charging system according to claim 9, wherein the second charger information further includes a total operating time being a sum of times for which the second charger has output charge power.

11. The charging system according to claim 9, wherein the second charger information further includes an elapsed time from when the second charger becomes into an idling state.

12. The charging system according to claim 9, wherein the controller of the first charger is configured to perform requesting for assistance power outputting only when an excess amount of the charge request power from the electrically-powered vehicle when connected to the charging port of the first charger exceeding the output power capacity of the first charger is equal to or smaller than a sum of the surplus power of the other chargers including the second charger.

13. The charging system according to claim 8,
wherein each of the chargers further includes an input portion configured to receive setting of a charge reservation provided by a user,
the second charger information further includes the setting of the charge reservation, and
the controller of the first charger is configured to exclude a charger having the charge reservation among the other chargers including the second charger from destinations of request for the assistance power outputting.

14. The charging system according to claim 9,
wherein each of the chargers further includes an input portion configured to receive setting of even charging provided by a user, and
the controller of the first charger is configured, when the setting of even charging is provided, to exclude a charger with surplus power being zero among the other chargers including the second charger from destinations of request for the assistance power outputting and to perform requesting for the assistance power outputting evenly to each of the other chargers that are not excluded.

\* \* \* \* \*